US007389259B2

(12) United States Patent
Duncan

(10) Patent No.: US 7,389,259 B2
(45) Date of Patent: *Jun. 17, 2008

(54) ON-LINE INTERACTIVE SYSTEM AND METHOD FOR TRANSACTING BUSINESS

(75) Inventor: Dana B. Duncan, Glenale, AZ (US)

(73) Assignee: Duncan Ventures, Inc., Glendale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 11/748,225

(22) Filed: May 14, 2007

(65) Prior Publication Data

US 2007/0214059 A1  Sep. 13, 2007

Related U.S. Application Data

(63) Continuation of application No. 11/097,491, filed on Apr. 1, 2005, now Pat. No. 7,249,078, which is a continuation of application No. 09/610,772, filed on Jul. 6, 2000, now Pat. No. 6,934,692.

(60) Provisional application No. 60/142,359, filed on Jul. 6, 1999.

(51) Int. Cl.
G06Q 40/00 (2006.01)
(52) U.S. Cl. ............................ 705/35; 705/37; 705/39; 705/26; 705/27; 705/14
(58) Field of Classification Search ................. 705/14, 705/37
See application file for complete search history.

(56) References Cited

U.S. PATENT DOCUMENTS

| 5,426,281 | A | 6/1995 | Abecassis |
| 5,710,887 | A | 1/1998 | Chelliah et al. |
| 5,715,314 | A | 2/1998 | Payne et al. |
| 5,717,989 | A | 2/1998 | Tozzoli et al. |
| 5,732,400 | A | 3/1998 | Mandler et al. |
| 5,742,845 | A | 4/1998 | Wagner |

(Continued)

FOREIGN PATENT DOCUMENTS

JP  11-003387  1/1999

(Continued)

OTHER PUBLICATIONS

Dexter Van Zile, E-Commerce, Seafood Business, Jan. 2000, pp. 46 & 48.

(Continued)

*Primary Examiner*—Eric Stamber
*Assistant Examiner*—Khanh H. Le
(74) *Attorney, Agent, or Firm*—Snell & Wilmer L.L.P.

(57) ABSTRACT

The present invention includes a method for transacting business over a network between multiple buyers and sellers. In an exemplary embodiment, the invention operates within an improved extranet system which is a secure, limited access network which operates within the larger public packet switched network (Internet) and allows only registered buyers and sellers to access the website while the system communicates with, and takes advantage of, existing credit, billing, collection, clearinghouse, insurance, transportation, tracking and banking systems. The interactive database includes real-time information in connection with a transaction, where the buyer submits a request for product and the request for the product locks out the requested product from selection by any other buyers.

19 Claims, 12 Drawing Sheets

U.S. PATENT DOCUMENTS

| | | | |
|---|---|---|---|
| 5,757,917 | A | 5/1998 | Rose et al. |
| 5,758,329 | A | 5/1998 | Wojcik |
| 5,826,241 | A | 10/1998 | Stein et al. |
| 5,826,242 | A | 10/1998 | Montulli |
| 5,870,723 | A | 2/1999 | Pare, Jr. et al. |
| 5,873,071 | A | 2/1999 | Ferstenberg et al. |
| 5,889,863 | A | 3/1999 | Weber |
| 5,890,137 | A | 3/1999 | Koreeda |
| 5,895,454 | A | 4/1999 | Harrington |
| 5,909,492 | A | 6/1999 | Payne et al. |
| 6,009,412 | A | 12/1999 | Storey |
| 6,058,378 | A * | 5/2000 | Clark et al. .................. 705/37 |
| 6,125,356 | A | 9/2000 | Brockman et al. |
| 6,151,588 | A | 11/2000 | Tozzoli et al. |
| 6,202,051 | B1 | 3/2001 | Woolston |
| 6,460,020 | B1 * | 10/2002 | Pool et al. .................... 705/26 |
| 7,155,409 | B1 * | 12/2006 | Stroh .......................... 705/37 |
| 7,249,069 | B2 * | 7/2007 | Alie et al. .................... 705/28 |
| 7,333,942 | B1 * | 2/2008 | Cowles ........................ 705/26 |
| 2005/0060584 | A1 | 3/2005 | Ginter et al. |

OTHER PUBLICATIONS

Deal Direct: GoFish.com Launches GoPipeLine(tm), Gofish.com News, Jul. 17, 2000 12:16 am, pp. 2.

Fedex Electronic Invoice and Remittance, Implementation Guide—U.S. Payor, Sep. 1999, pp. 1-45.

Fedex EDI Invoicing and Remittance, Implementation Guide—U.S. Payor, Sep. 1999, pp. 80.

No More Secrets, Seafood Leader vol. 18, No. 2, Mar./Apr. 1998, pp. 5.

Market News Finfish—Finally Cod Takes Off, Seafood Leader, May/Jun. 1998, pp. 6.

Market News Salmon—Low Prices Keep Salmon Moving, But . . . , Seafood Leader, May/Jun. 1998, pp. 8.

Market News Shellfish—Snow Crab's A Winner, Seafood Leader, May/Jun. 1998, pp. 10.

Market News Shrimp—Surprise Supplies, Seafood Leader, May/Jun. 1998, pp. 12.

Heads & Tails—More Pain For West Coast Industry, Seafood Leader, May/Jun. 1998, pp. 16-17.

www.seafoodbuyer.com, Seafood.com, 1999, pp. 1.

www.fishmonger.com, Feb. 10, 2000 09:26:51 AM PST, pp. 1.

www.gofresh.com, pp. 1.

www.worldcatch.com, pp. 1.

Dana B. Duncan, Welcome to Ralboray, Inc., Ralboray, Incorporated, 1999, pp. 10.

Automating The Financial Supply Chain, www.tradecard.com/sampleflash/auto.html (11 pgs.).

TradeCard Facts as of Mar. 2002, www.tradecard.com/features/tradecardfacts.html (1 pg.).

Select pages from TradeCard website entitled Online Transaction Management, TradeCard Facts, TradeCard Demos and Product (4 pages).

Web page by TradeCard entitled Financial Supply Chain Automation: The Missing Link in Supply Chain Management (8 pages).

Select pages from TradeCard website entitled Kurt Cavano, Chairman and CEO, About TradeCard, Company Profile, Company Profile—Rosilli/Jumbo Shoes, Company, The Technology and Security, Conclusion, and A Word on the Patent.

J.J. Lamb, An Evolutionary Idea, World Trade v8 n7 p. 40+, Aug. 1995, Dialog File 13, Record # 1004390.

R.G. Powell, Climbing the Risk Ladder, Business Credit v95n6, pp. 36-39, Jun. 1993.

Rogers et al, Warehousing Firms: The Impact of Alliance Involvement, Journal of Business Logistics v16 n2, pp. 249-269, 1995, Dialog File 15 Record # 01094742.

M. S. Spencer, JIT Systems and External Logistics Suppliers, International Journal of Operations & Production Management v14n6 pp. 60-74, 1994, Dialog File 15 Record #00915982.

* cited by examiner

801

Hello
Sam
Flying Fish Co.

Advertising Banner - Rolling Ads

| Main Menu | Advertisers | More Info |

Fresh &/or Frozen -- Fresh Water

| # | Product | Size | Pack | Quality | **Origin | **Label | Quantity | $/# |
|---|---|---|---|---|---|---|---|---|
| 501 | Coho | 8 oz. | Frzn. | | | Sitka Sound | 12,050 | 3.40 |
| 502 | Coho | 10 oz. | Frzn. | | | Sitka Sound | 2,375 | 3.40 |
| 302 | Catfish Fillet | | | | | Sitka Sound | 7,500 | 2.60 |
| 307 | Catfish Nuggets | | | | | Sitka Sound | 230 | 1.45 |
| 305 | Pan Ready Catfish | | | | | Sitka Sound | 1,575 | 1.95 |
| 409 | Boned Trout | 8 oz. | | | | Sitka Sound | 150 | 2.85 |
| 412 | Boned Trout | 10 oz. | | | | Sitka Sound | -0- | 2.85 |
| 424 | C/C Trout | 8 oz. | | | | Sitka Sound | 1,300 | 4.45 |
| 417 | Dressed Trout | | | | | Sitka Sound | 25 | 2.08 |
| 418 | Red Mt. Fillet Trout | | | | | Sitka Sound | 750 | 3.90 |
| 403 | Sturgeon Loin | | Fresh | | | Sitka Sound | 32,000 | 6.50 |
| 103 | Walleye Fillet Sk/On | | | | | Sitka Sound | 3,600 | 7.25 |
| 101 | Whitefish Sk/On | | | | | Sitka Sound | 43,000 | 2.25 |
| 104 | Stripped Bass Sk/On | | | | | Sitka Sound | -0- | 8.00 |
| 141 | Artic Charr Fillet | | | | | Sitka Sound | 175 | 12.00 |
| 110 | Wild S. Bass Sk/Off | | | | | Sitka Sound | 375 | 15.25 |

Clients highlight items they wish to purchase.

FIGURE 8

ON-LINE INTERACTIVE SYSTEM AND METHOD FOR TRANSACTING BUSINESS

CROSS REFERENCE TO RELATED APPLICATIONS

This application is a continuation of, and claims the benefit of and priority to, U.S. patent application Ser. No. 11/097,491, entitled "ON-LINE INTERACTIVE SYSTEM AND METHOD FOR TRANSACTING BUSINESS" and filed on Apr. 1, 2005, which itself claims the benefit of and priority to U.S. patent application Ser. No. 09/610,772 (U.S. Pat. No. 6,934,692, which issued Aug. 23, 2005), entitled "ON-LINE INTERACTIVE SYSTEM AND METHOD FOR TRANSACTING BUSINESS" and filed Jul. 6, 2000, which itself claims priority to U.S. Provisional Application Ser. No. 60/142,359, filed Jul. 6, 1999.

TECHNICAL FIELD

The invention generally relates to a method for transacting business over a network, and more particularly, to a method which allows multiple buyers and sellers to transact business using an improved extranet system which organizes and utilizes clearinghouse, credit, shipping, transportation, and banking networks.

BACKGROUND OF THE INVENTION

Many companies and individuals use various methods for transacting business over the Internet. Using the Internet to transact business provides a fast, efficient, and convenient means for the various parties to interact in an on-line environment. Generally, a seller offers products (goods, services, information or the like) on a website which is viewed by a buyer. If the buyer wishes to purchase the product, the buyer supplies a credit card number or other form of payment or credit to the seller. However, the seller then often is required to verify that the buyer's credit card account is authorized, bill for the product, collect the amount owed, arrange for transportation, obtain insurance on the goods shipment and track the shipment of the goods. Additionally, when the buyer uses its credit line to purchase the goods, the buyer's credit line is depleted until the buyer supplies payment for the goods or cancels the order. Oftentimes, the buyer or seller needs to find a financial institution to be involved in the transaction process. Moreover, for the parties involved, determining supply and demand while maintaining an appropriate inventory of goods is difficult. As such, buyers and sellers have encountered large expenses in, for example, storage fees, inventory costs, and disposal fees, especially in the perishable goods industry.

One example of a perishable goods industry is the seafood industry. Typically, a seller receives inventory and contacts the buyer in order to make a sale. Once the transaction is negotiated, the product is delivered to the buyer. The seller, however, usually waits 30-120 days after delivery to receive payment for the goods. As such, the seller's money may remain tied up in delivered inventory until (if ever) payment is finally made by the buyer. In addition, poor transportation planning, data storage and retrieval, and communication have resulted in a waste of substantial amounts of time and money, which ultimately has a detrimental effect on the seafood distributors and the ultimate consumer. For example, current industry practice typically allows for frequent glut/shortage scenarios, where large unsold supplies in one area and unavoidable boom or bust catches of fishermen results in low prices for the fishermen and high prices and decreased quality (e.g., from storage and/or freezing) to the ultimate consumer. Thus, a method and system for efficient supply, demand, delivery and payment of perishable goods is needed to more evenly distribute the benefits and burdens of the impacted industry.

SUMMARY OF AN EXEMPLARY EMBODIMENT

The present invention includes a method for transacting business over a network between multiple buyers and sellers. In an exemplary embodiment, the invention operates within an improved extranet system which is a secure, limited access network which operates within the larger public packet switched network (Internet) and allows only registered buyers and sellers to access the website while the system communicates with, and takes advantage of, existing credit, billing, collection, clearinghouse, insurance, transportation, tracking and banking systems. The interactive database includes real-time information in connection with a transaction, where the buyer submits a request for product and the request for the product locks out the requested product from selection by any other buyers.

The buyer information and purchase data is routed to a clearinghouse, which either approves or rejects the request based on the buyer's pre-existing profile and credit information. If the clearinghouse accepts the request, the shipper, buyer, and/or seller are notified. If the clearinghouse rejects the request, then the requested product is released. Notifying the shipper, the buyer, and/or the seller includes specifying pickup and delivery terms for the shipper, notifying the buyer of the approval of the request and specifying the purchase terms, delivering a product to the buyer, generating a delivery confirmation and sending the delivery confirmation to the financial institution, collecting a payment from a financial institution, and eventually distributing the payment to at least one of the interactive database, the clearinghouse, and the seller.

BRIEF DESCRIPTION OF EXEMPLARY DRAWING FIGURES

The subject invention will hereinafter be described in the context of the appended drawing figures, wherein like numerals denote like elements, and:

FIG. 8 illustrates a web page that the buyer and/or seller may encounter in selecting one or more products in accordance with an exemplary embodiment of the present invention;

DETAILED DESCRIPTION

Figure 1:
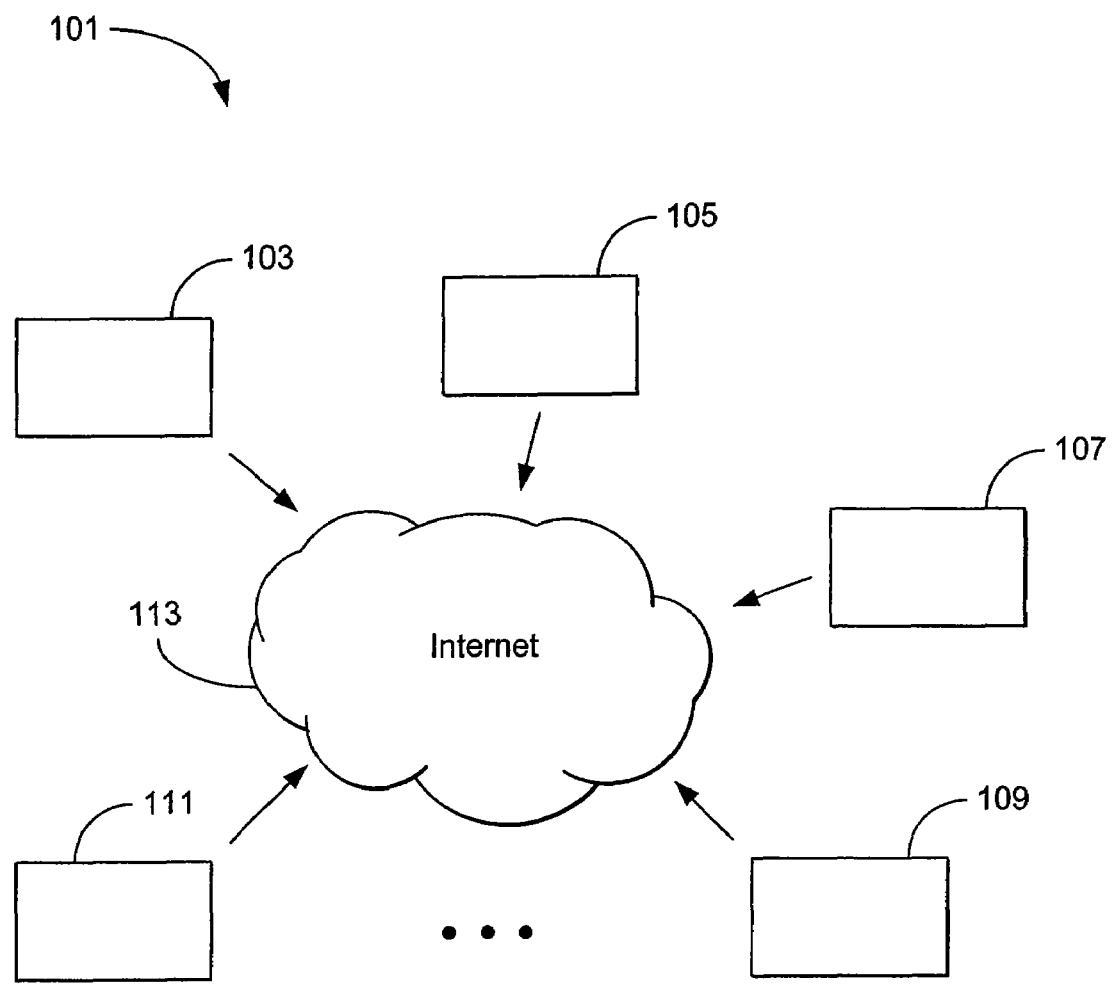
FIG. 1 illustrates an exemplary embodiment of various parties transacting business over the Internet.

In general, the present invention includes a unique method for transacting business over a network between multiple buyers and sellers. The system communicates with, and takes advantage of, existing credit, billing, collection, clearinghouse, insurance, transportation, tracking and banking systems to increase the distribution and financial process for buyers and sellers. The interactive database includes real-time information in connection with a transaction, where the buyer submits a request for product and the request for the product locks out the requested product from selection by any other buyers. One skilled in the art will appreciate that product may include goods, services, information, digital data and/or the like. The buyer information and purchase data are routed to a clearinghouse, which either approves or rejects the request based on, for example, the buyer's pre-existing profile, order history, inspection information, credit information and/or the like. If the clearinghouse accepts the request, the shipper, buyer, and/or seller are notified. If the clearinghouse rejects the request, then the requested product is released. Notifying the shipper, the buyer, and/or the seller includes specifying pickup and delivery terms for the shipper, notifying the buyer of the approval of the request and specifying the purchase terms, delivering a product to the buyer, generating a delivery confirmation and sending the delivery confirmation to the financial institution, collecting a payment from a financial institution, and eventually distributing the payment to at least one of the interactive database, the clearinghouse, and the seller.

In an exemplary embodiment, the present invention operates within an improved extranet system which is a secure, limited access network which operates within the larger public packet switched network (Internet) and allows only registered buyers and sellers to access the website. In contrast to many websites on the Internet which allow anyone to enter the website, use its functions or order products, extranet systems provide limited access to website functionality by requiring, for example, pre-registration and password entry. For example, one buyer (e.g., General Motors) may be involved in an extranet system with multiple suppliers (e.g., steel, glass, plastics, electronics, paint, rubber, etc.) and the buyer can request just in time needs to suppliers for production and shipment. Another version of an extranet system involves multiple sellers and buyers, wherein the sellers advertise products for sale on a bulletin board or auction format. The seller then can sell its products to, for example, all buyers, the first buyer, or the highest bidder. However, this system often requires the sellers to approve the buyer's credit, bill for products, engage in collection activities, arrange for transportation and track the shipment of the goods. Additionally, these sites are often limited to non-perishable products and materials because the inventory is not distributed in a timely manner. Furthermore, after the seller and buyer are matched, further negotiations are needed to establish terms of sale and other details, thereby resulting in inefficient use of time with phone calls, emails and faxes.

The present invention enhances extranet functionality by substantially reducing the sellers and buyers actions in the purchasing process by providing an integration of systems to maximize convenience and efficiency. In general, the present invention performs various functions for the sellers and buyers, thereby allowing real-time transactions. For example, the present invention pre-qualifies all participants, provides changes in prices and products, provides databases and financial relationships to assist in the collection and payment of funds within, for example, 2-10 days, and provides connections to transportation systems to enhance the scheduling and tracking of products. In an exemplary embodiment, the present system communicates with a shipper's (e.g., Federal Express$^{SM}$, and/or United Parcel Service$^{SM}$) system and database to share its credit information, shipping information, tracking information, reporting functionality and banking relationships, thereby enhancing the functionality of the present invention. Because of the increased distribution and payment efficiencies, the present invention is well-suited for the distribution of perishable items, such as seafood.

In an exemplary embodiment, the present invention collateralizes upon existing banking relationships of the shippers to provide for efficient payment and receipt of funds while minimizing currency exchange rate problems. Many international shippers (e.g., Federal Express$^{SM}$, United Parcel Service$^{SM}$) have established an international network of banking relationships such that the shipper has an account and networked system with a bank in each industrialized country. Because it is difficult for individual buyers or sellers to establish a banking relationship in numerous countries, the present invention collateralizes and takes advantage of the shipper's pre-existing network by, with respect to FIG. 11, establishing a communication link between interactive database 1107, through clearinghouse 1109, to the shippers' banks 1111 systems. Clearinghouse 1109 is any database, system, network, or combination thereof suitably configured to receive or transmit data, communicate with other networks or databases or analyze the qualifications of a member of the present system. Moreover, clearinghouse 1109 may be a separate system, incorporated into the interactive database 213, 1107, incorporated into the shipper system 207, 1108 or any combination thereof.

In particular, when the buyer orders product and the seller is notified that sufficient funds exist, clearinghouse 1109 instructs the bank to put a hold on the buyer's payment in the same country where the buyer is located. After the buyer receives and accepts the product by providing an electronic approval of the product shipment to the clearinghouse, the clearinghouse instructs the bank to release a portion of the buyer's funds/credit to the shipper's bank in the same country where the buyer's bank is located. During the same time period, the clearinghouse instructs the shipper's bank in the seller's country to release the payment to the seller's account. Also during the same time period, the clearinghouse instructs the shipper's bank in the host's (host of interactive database 1107) country to release another portion of the buyer's payment to an account of the host as a transaction fee. Optionally, any of shipper's banks may retain its own transaction fees. Because the money is being released in the respective countries and not being transferred between countries, the problems associated with exchange rates are minimized. Furthermore, because the shipper obtains interest on the float of the buyer's money, the transaction fee payment to the host may be a portion of the interest earned, so the shipper and the host benefit from the transaction. One skilled in the art will appreciate that full payment or any portion thereof may be released to any one of the aforementioned banks. Moreover, upon release of the buyer's payment, the buyer is able to re-establish its line of credit, so that the buyer is able to purchase other goods without further delay. Similarly, if the buyer cancels the order or rejects the product, the hold on the buyer's payment (less any shipping or other incurred charges) is removed, thereby allowing the buyer to more quickly re-establish its line of credit.

The present invention may be described herein in terms of functional block components and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

To simplify the description of the exemplary embodiments, the invention is frequently described as pertaining to a system of electronic commerce running over the Internet. It will be appreciated, however, that many applications of the present invention could be formulated. One skilled in the art will appreciate that the network may include any system for exchanging data or transacting business, such as the Internet, an intranet, an extranet, WAN, LAN, satellite communications, and/or the like. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, while the exemplary embodiment will be described as a system for sales and distribution of seafood using a specialized extranet, the system contemplates the use, sale or distribution of any goods, services or information over any network having similar functionality described herein.

More particularly, with respect to FIG. 1, various parties transacting business over the Internet 113 are shown. The various parties include, for example, a first party 103, a second party 105, a third party 107, a fourth party 109, and an nth party 111. For example, first party 103 may be a buyer, second party 105 may be a seller, third party 107 may be a financial institution, fourth party 109 may be a shipper, and so on. The various parties may transact business with each other by using Internet 113 as a means of communication. As is well known in the art, Internet 113 is a compilation of networks that may communicate with one another or may include any system for exchanging data or transacting business, such as the Internet, an intranet, an extranet, WAN, LAN and/or the like.

Figure 2:
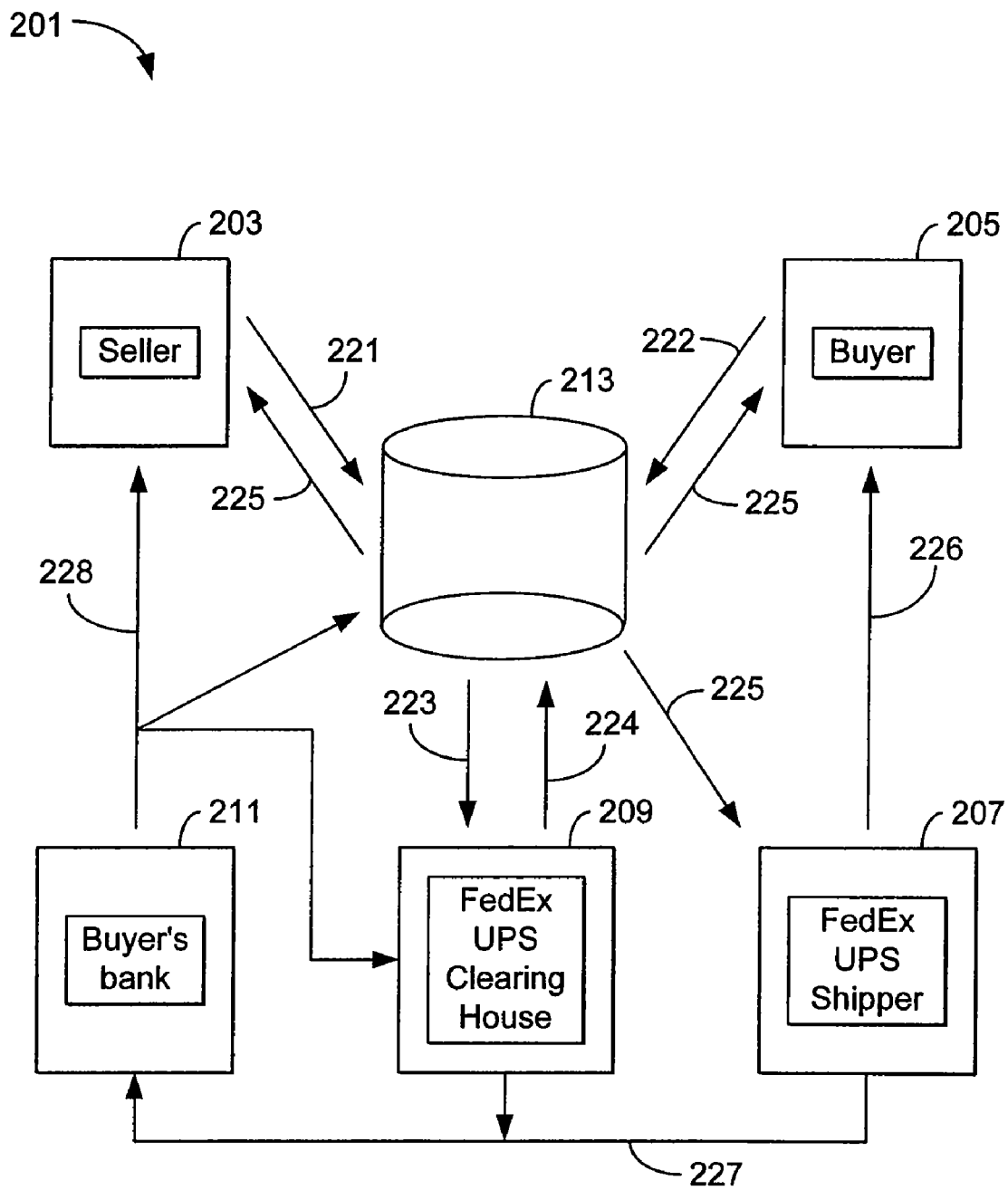
FIG. 2 illustrates a system for transacting business over the Internet in accordance with an exemplary embodiment of the present invention.

Referring now to FIG. 2, a system 201 for transacting business over the Internet is provided in accordance with an exemplary embodiment of the present invention. System 201 includes a first party 203, such as a seller of goods; a second party 205, such as a buyer of goods; a third party 207, such as a distributor or shipper of goods; a fourth party 209, such as a clearinghouse for approval of members and interaction with the banking networks and shipper networks; and a fifth party 211, such as a financial institution. Although the various parties are illustrated as separate entities, one or more of the parties/entities may be combined (e.g., the financial institution, the clearinghouse, and the shipper of goods may be one party/entity). Of course, the transaction could just as easily involve services and either more or less parties than those illustrated. Each of first, second, third, fourth, and fifth parties 203, 205, 207, 209, and 211, respectively, communicate via an interactive database 213 (also referred to as IDB) (interactive database 1107 in FIG. 11 has similar functionality). Furthermore, the clearinghouse is any database, system, network, or combination thereof suitably configured to receive or transmit data, communicate with other networks or databases or analyze the qualifications of a member of the present system. Moreover, clearinghouse may be a separate system, incorporated into the interactive database 213, 1107, incorporated into the shipper system 207, 1108 or any combination thereof.

Interactive database 213 provides an on-line database for the various parties to access to assist in carrying out a transaction. For example, interactive database 213 may be stored on a server (not shown) such that each party may access interactive database 213 via the Internet. That is, each party could access interactive database 213 via a web site for on-line interactive communication. Of course, interactive database 213 may be implemented in any number of communication systems, including wireless communication, packet switched networks (e.g., via an Internet Service Provider (ISP)), wired communication, intranet, extranet, and the like. To further illustrate the variety of communication media that interactive database 213 may be implemented in, cellular phones, lap tops, palm pilot® technology, modems, and the like may be used. In addition, such a web site may be implemented in, for example, different languages or in different countries.

To understand an exemplary method of conducting business using system 201, FIG. 2 also illustrates the various steps in a transaction. First party 203 accesses interactive database 213 (e.g., a web page) through Internet 113 and inputs information in connection with the transaction (step 221). Second party 205 submits a request for product, for example, in connection with the inputted information (step 222). Once a request for product is submitted, the request locks out the particular product from further selection by another buyer. In this manner, other requests for the exact same product will not have access to the locked out requested information, unless the requested information is subsequently released, as discussed below. Next, information is routed in connection with the request to a clearinghouse for approval, where the clearinghouse accepts or rejects the request (steps 223 and 224). For example, the clearinghouse may accept or reject the request based on a profile of the buyer, credit history of the buyer or inspection information. If the clearinghouse accepts the request, then at least one of first party 203, second party 205, or third party 207 are notified, for example (step 225). Of course, notification could involve more parties, less parties, or different parties as well depending on the context in which system 201 is used. Alternatively, if the clearinghouse rejects the request, then the requested information is released so that the requested information is no longer locked out. Once the requested information is no longer locked out, then other parties may request a product in connection with such released requested information.

If the clearinghouse accepts the request, the product may then be delivered to second party 205 (step 226). For example, if second party 205 is a buyer of goods, then step 226 would illustrate the delivery of the requested product to the buyer. Payment collection is illustrated in step 227, where payment may be due at the time of delivery of the request (e.g., the product) to the buyer. For example, at least one of the clearinghouse or the shipper may request payment from the buyer upon confirmation of delivery. Payment distribution may involve paying a fee to first party 203, where first party 203 may be a seller (step 228). For example, if fifth party 211 is a financial institution, fourth party 209 is a clearinghouse, and third party 207 is a shipper, then the financial institution pays the appropriate fee from the buyer's funds to any or all of the other parties involved. Thus, system 201 provides one method of transacting business in accordance with an exemplary embodiment of the present invention.

Figure 3:
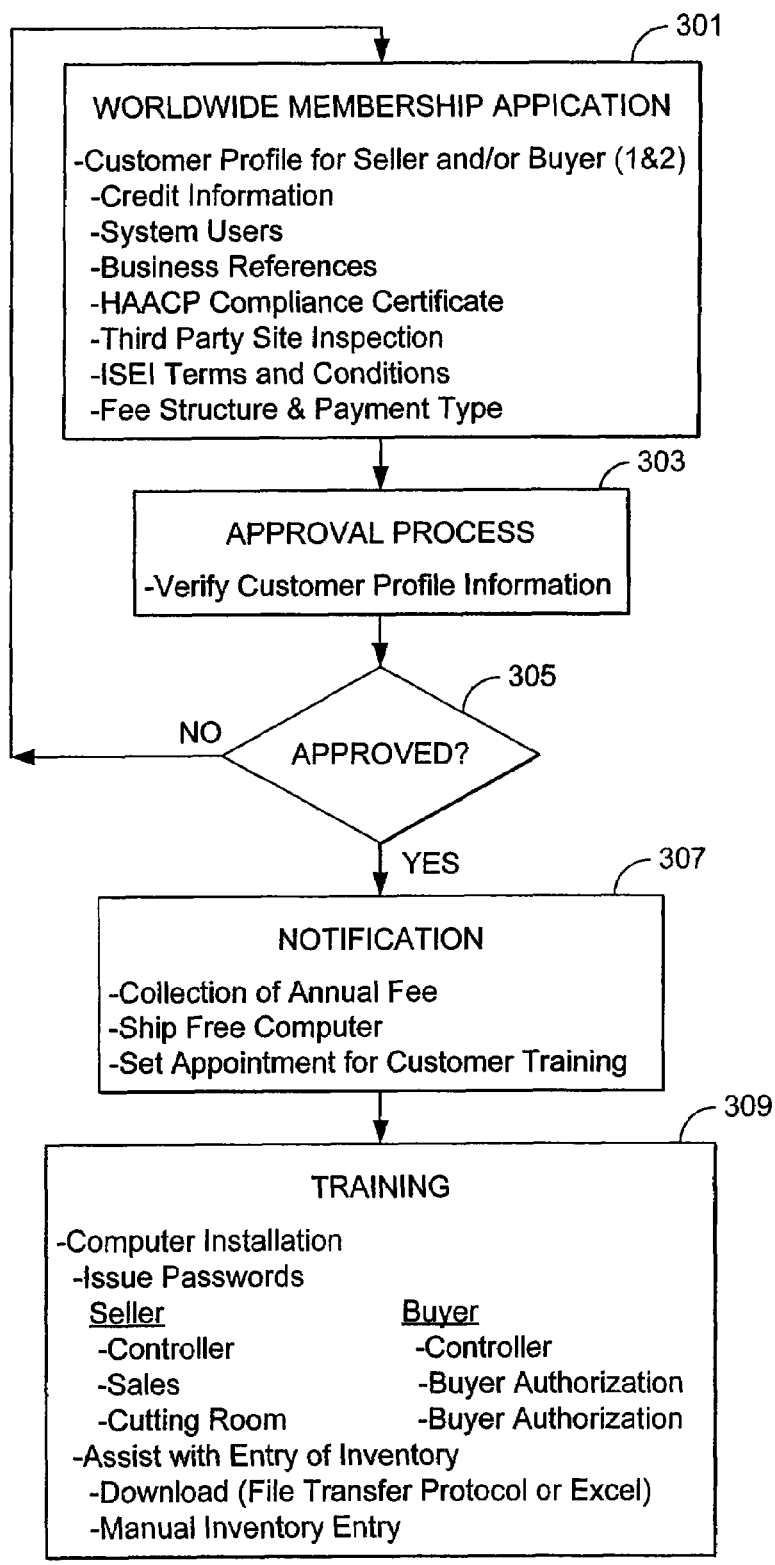
FIG. 3 illustrates a flowchart for obtaining access rights to an interactive database in accordance with an exemplary embodiment of the present invention.

To better understand the different steps for transacting business over the Internet using system 201, it is first helpful to analyze the steps involved in gaining access to system 201. For example, as discussed above, system 201 may be implemented in an extranet environment, where only users having predetermined access rights may access and use interactive database 213. FIG. 3 illustrates a flowchart for obtaining access rights to interactive database 213 in accordance with an exemplary embodiment of the present invention. Access rights may not be needed for viewing some features of interactive database 213; however, predetermined access rights maybe imposed on various parties depending on the extent of control that is desired. For example, access to inventory, pricing, products, party profiles, and the like may require predetermined access rights. However, information on advertising, weather, rules and regulations relevant to the fishing and/or seafood industry, Fish & Game, Coast Guard, marine and fishing equipment, and the like may not require predetermined access rights.

A worldwide membership application having a profile for a buyer and/or seller is submitted (step 301). The profile may include the buyer and/or seller's credit information, system users (e.g., names of users, levels of security, and persons/entities having access such as controllers, salespersons, buyers, and/or shipping/receiving persons), business references/contacts (e.g., preferred buyers and/or sellers, buyer's custom purchase order), Hazard Analysis and Critical Control Point (HAACP) Compliance Certificate in accordance with Federal Drug Administration (FDA) regulations, third party site inspection information, terms and conditions of membership (e.g., information regarding a designated bank, line of credit, amount/percentage of inventory for posting, using Certified Insured Freight (CIF)), and fee structure and payment type (e.g., annual fee, percentage of transaction, etc.), among other things.

The submitted membership application goes through an automated or manual approval process, and is either approved or rejected (steps 303 and 305). For example, in step 303, the buyer and/or seller's profile may be verified for completeness and accuracy of information. In addition, the third party site inspection of parties' facilities may take into account government health standards, facility efficiency, and the like. If the membership application is not approved in step 305, then the prospective member does not gain access rights and another membership application may be submitted. On the other hand, if the membership application is approved in step 305, then the prospective member is notified (step 307). For example, notification may include collecting an annual membership fee from the prospective member (e.g., the buyer and/or the seller), issuing at least one "secure" password and/or at least one user account, shipping a computer to the new member, and/or scheduling a training appointment for the customer/new member, among other things. Training may include computer installation, issuance of passwords, assistance with entry of inventory information (e.g., manual inventory entry, downloading inventory via File Transfer Protocol (FTP), Excel, and/or the like), and/or further customizing the system to the buyer and/or seller's industry (step 309). Thus, once a party obtains access to interactive database 213, that party may transact business over the Internet using interactive database 213. Ideally, numerous buyers and/or sellers would use interactive database 213 to transact business over the Internet.

Figure 4:
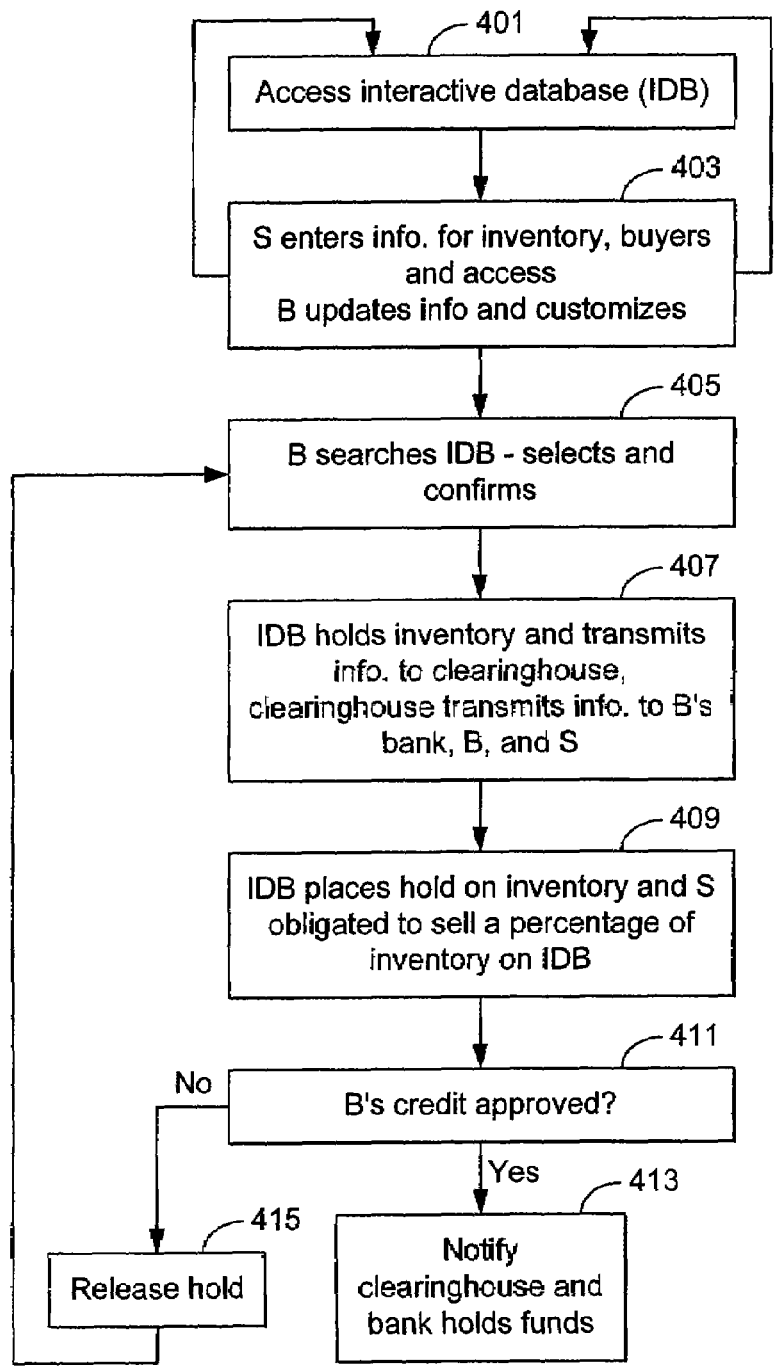
FIG. 4 illustrates a method for transacting business between a buyer and a seller using an interactive database in accordance with an exemplary embodiment of the present invention.
Figure 6:
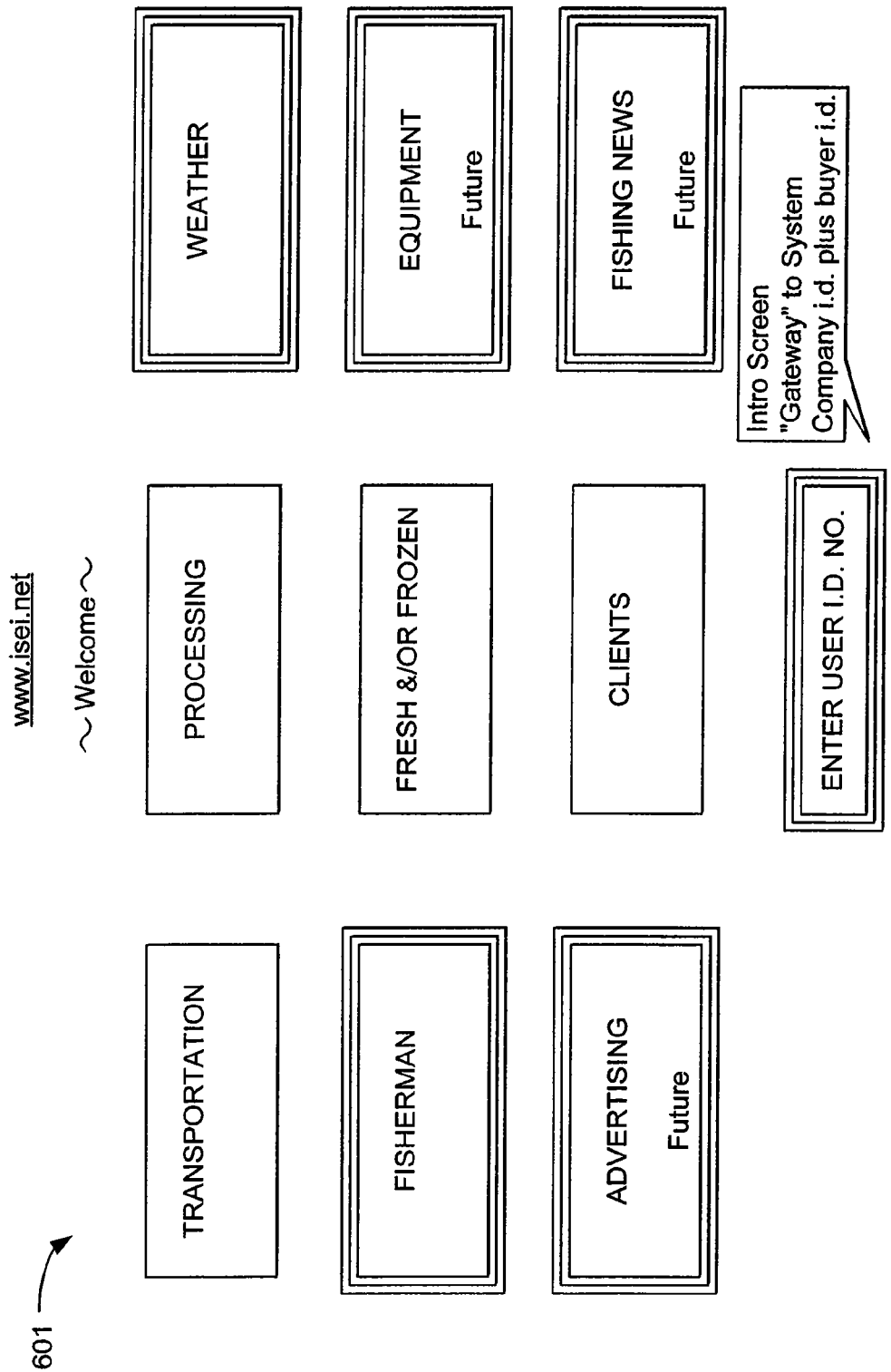
FIG. 6 illustrates a web page that the buyer and/or seller may encounter in attempting to access an interactive database in accordance with an exemplary embodiment of the present invention.

With respect to FIG. 4, a method for transacting business between a buyer and a seller using interactive database 213 in accordance with an exemplary embodiment of the present invention is shown. Of course, the method of FIG. 4 may be implemented for any type of business transaction in any applicable industry depending on the needs of the buyer and seller. In addition, the present invention may support multiple buyers, sellers, financial institutions, and/or various other parties, but is most often illustrated herein by one buyer and one seller for simplicity. In addition, a buyer (or other party) may be involved in multiple transactions simultaneously, as long as the party's profile (e.g., credit, funds, other financial information, etc.) is adequate. By way of illustration, one embodiment of the method in FIG. 4 may be implemented in the context of a buyer and a seller in the perishable food industry such as the seafood industry, for example. For simplicity, exemplary information will be discussed in the context of the seafood industry, but is not limited as such. The buyer and/or the seller access interactive database 213 (step 401). By way of illustration, a web page 601 in accordance with an exemplary embodiment of the present invention that the buyer and/or seller may encounter in attempting to access interactive database 213 is illustrated in FIG. 6. The buyer and/or seller may be required to have predetermined access rights as discussed above in order to enter interactive database 213 by way of using a user identification (I.D.) code, e.g., a user I.D., password, I.D. number, etc.

The seller (S) enters information into interactive database 213, such as inventory including product information, SKU numbers, fresh or frozen characteristics of the seafood (e.g., fresh may be date stamped), type of seafood (e.g., species name, Latin, common, colloquial, etc.), sales information (e.g., price, quantity, inventory update), buyer information, and/or the like (step 403). Additionally, the seller may update/change certain passwords and levels of access, identify/update existing buyers, access information on weather, rules and regulations relevant to the fishing and/or seafood industry, Fish & Game, Coast Guard, marine and fishing equipment, run reports for accounting, inventory, and/or sales, and the like. In this way, product information and changes are in substantially real-time and sales may take place 24 hours a day and 7 seven days a week, thereby allowing all parties to have access to the continuously changing information as the changes are made. Also, the interactive database may mirror the seller's SKU numbers, for example, in order to facilitate integration and communication. In addition, the buyer (B) may update/change certain password information, levels of access, existing sellers, and/or Freight On Board (FOB) points/locations, customize purchase order information, run reports for accounting, inventory, and/or sales, and/or the like, for example. Step 403 may occur continuously and simultaneously in accordance with the other method steps in FIG. 4.

Figure 7:
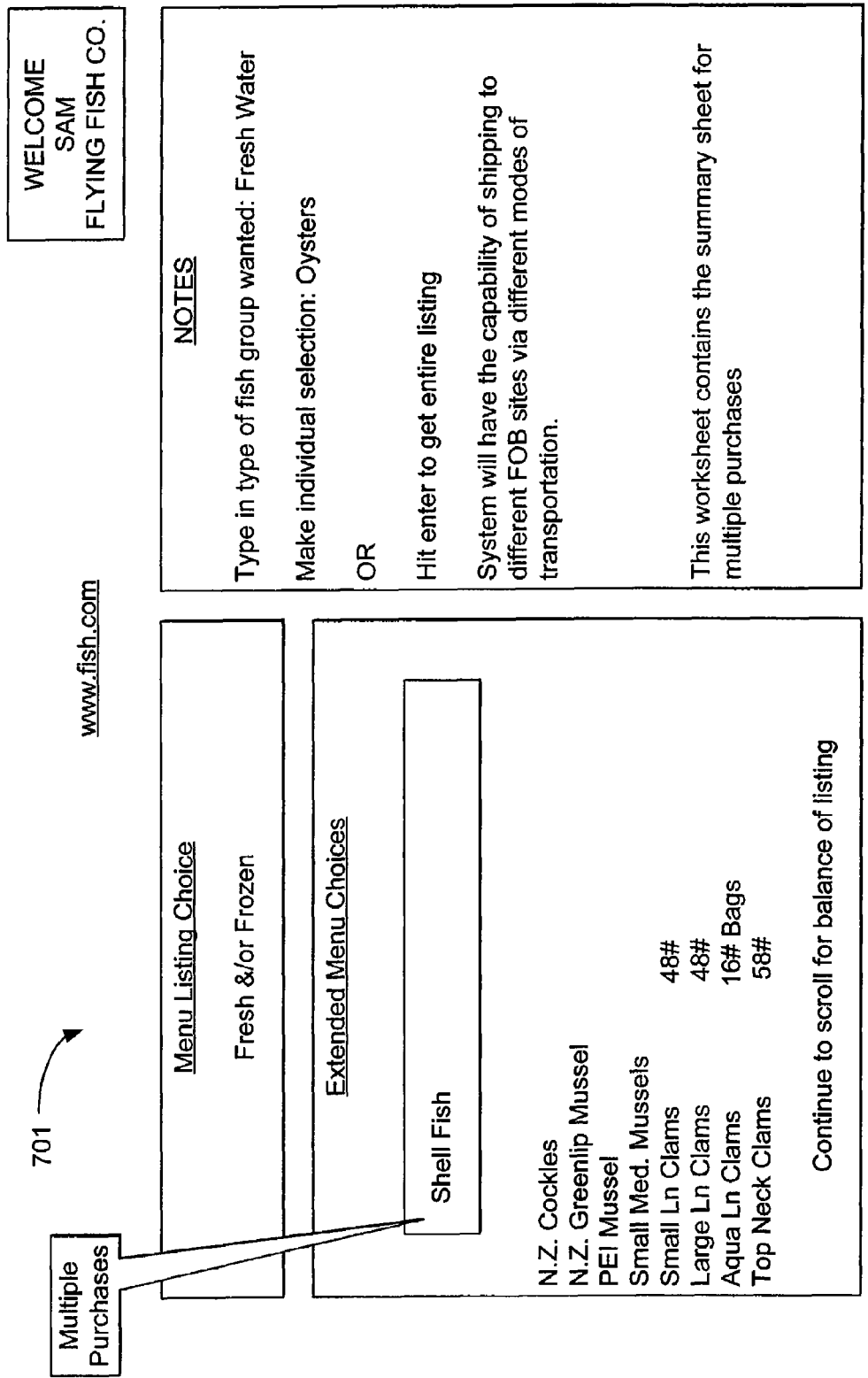
FIG. 7 illustrates a web page where the buyer may enter the type of seafood desired, make an individual selection or multiple selections, and purchase the desired seafood in accordance with an exemplary embodiment of the present invention.

The buyer having a buyer profile may search interactive database 213 using various search criteria, such as price, quantity, fresh or frozen characteristics of the seafood, packaging, and/or type or species of seafood, for example (step 405). In addition, the buyer may identify existing sellers. The buyer may also select one or more products, including species, quantity, price, fresh/frozen, packaging, and the like, and confirm the selection(s). For example, confirmation may be in the buyer's country currency, and include product cost, freight, CIF, tariffs, duties, and/or transaction fees. For example, FIG. 7 illustrates a web page 701 in accordance with an exemplary embodiment of the present invention, where the buyer may enter the type of seafood desired (e.g., fresh water), make an individual selection (e.g., oysters) or multiple selections (e.g., shell fish), and purchase the desired seafood. In addition, interactive database 213 may have the capability of shipping to multiple FOB sites via different modes of transportation, so that the buyer may select various drop shipping points. Also, the buyer may rely on previously selected FOB sites, where interactive database 213 may re-count such information.

Figure 9:
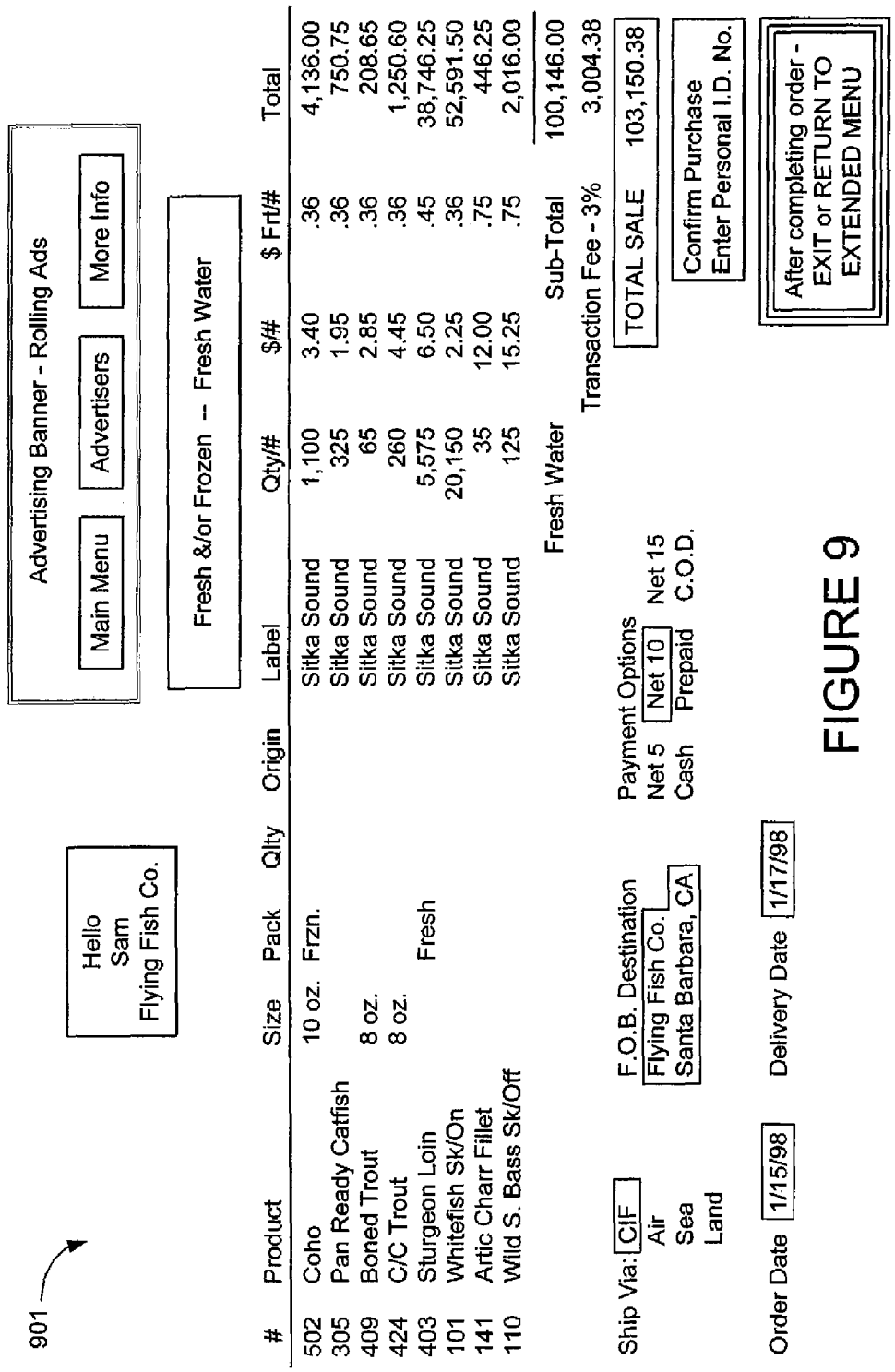
FIG. 9 illustrates a web page including purchase order, shipping, and fee information in accordance with an exemplary embodiment of the present invention.

Also, by way of illustration, a web page 801 in accordance with an exemplary embodiment of the present invention that the buyer and/or seller may encounter in selecting one or more products is illustrated in FIG. 8. Web page 801 identifies the buyer as "Sam Flying Fish Co." and displays various seafood items that the buyer has selected to purchase, including the product, size, packaging (e.g., fresh/frozen), quality, origin, label, quantity, and price per pound, for example. Of course, as discussed above, the exemplary embodiments are illustrated in the context of the seafood industry; as such, various information illustrated herein would be different or varied in other industries depending on the various needs of that specific industry. In this exemplary embodiment, confirming the choice may include adding drop shipping points, where interactive database 213 stores worldwide FOB information in connection with the buyer. For example, the buyer may have multiple business locations or sell to customers having multiple business locations. In addition, the price may be confirmed including product fee, freight fee, and transaction fee in the specified country's currency. A web page 901 in FIG. 9 further illustrates such purchase order, shipping, and fee information in accordance with an exemplary embodiment of the present invention. For example, web page 901 displays the product, size, packaging, quality, origin, label, quantity in pounds, price per pound, freight price per pound, total prices, total sale price, shipping information, payment options, order date, and delivery date. Of course, various other information may also or alternatively be displayed depending on the industry and/or use for which interactive database 213 is implemented: Optionally, in order to further provide a secure environment, interactive database 213 may require confirmation of the buyer's personal identification (I.D.) number, for example.

Figure 10:
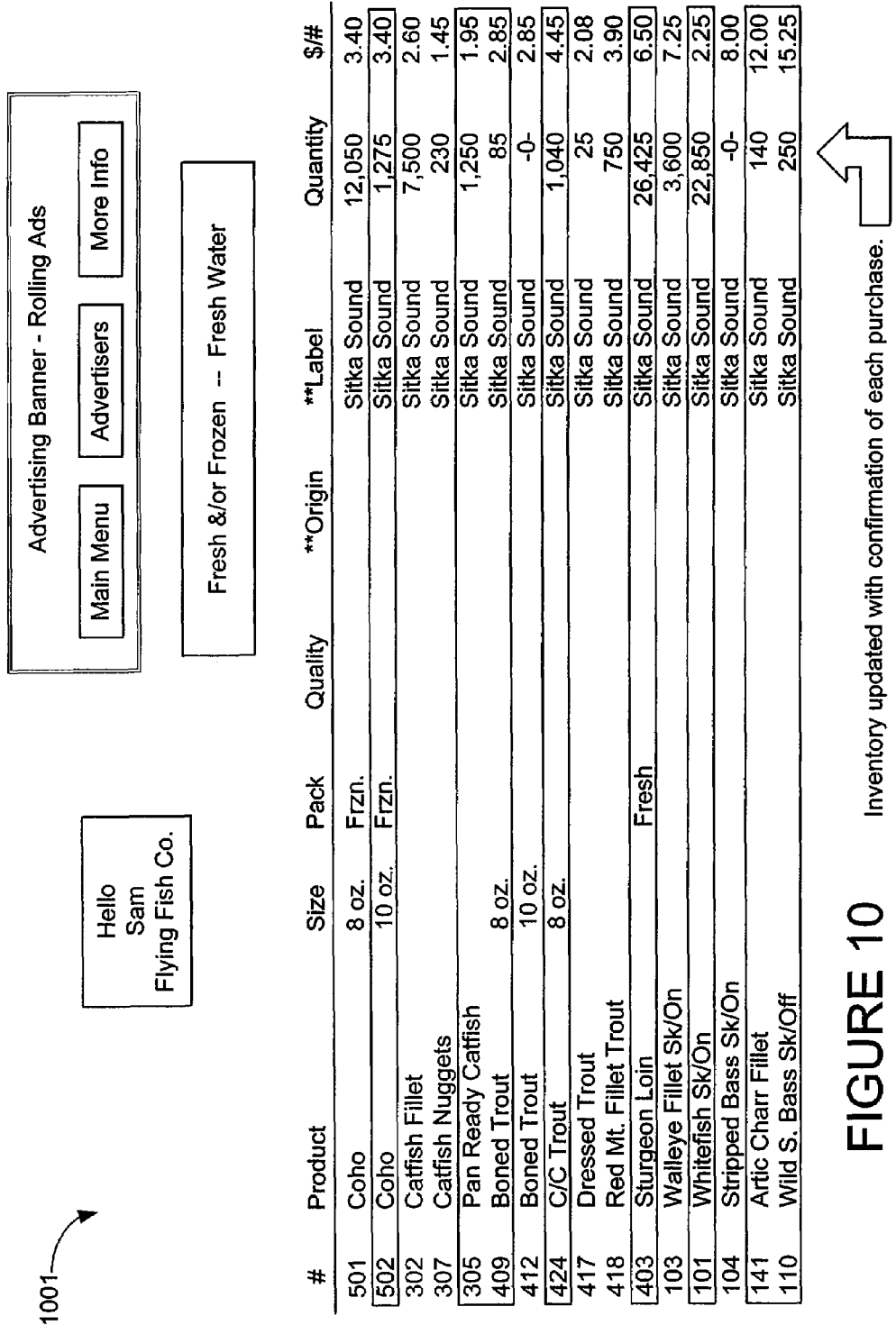
FIG. 10 illustrates a web page including inventory that has been updated to reflect the buyer's confirmed choice for purchase in FIG. 9 in accordance with an exemplary embodiment of the present invention.

In step 407, once the buyer confirms the selection (i.e., buys the product), then interactive database 213 confirms the purchase by placing a hold on the product in accordance with the information confirmed in step 405 above. Placing a hold on the product/inventory removes it from the inventory available for sale. By way of illustration, in FIG. 10, an exemplary web page 1001 illustrates inventory that has been updated to reflect the buyer's confirmed choice for purchase in FIG. 9. In this way, the inventory placed on hold reflects the confirmed choice made in the exemplary web page in FIG. 9. At this point, interactive database 213 transmits the order information to a clearinghouse. The order information may include the buyer, species purchased, quantity, price, packaging, destination of order, and/or the seller, among other information. In addition, in step 407, the clearinghouse transmits information to at least one of the buyer's bank, the buyer, and the seller. For example, the buyer's bank may be in the buyer's country of origin, where the bank checks the buyer's designated account and verifies the buyer's available credit in accordance with the buyer's order. The buyer and/or seller may receive information including confirmation (e.g., via electronic mail) from the clearinghouse, pending order information, species, quantity, price, packaging, shipping information (e.g., destination, projected ship date), and the like.

The seller is contractually obligated not to sell inventory in connection with the buyer's order that is posted in the interactive database when the interactive database places a hold on the inventory listed in the buyer's order (step 409). In this way, the product in connection with the buyer's order will not be available for sale to other buyers/parties. Next, a determination is made as to whether the buyer's credit is approved (step 411). The various information for approving the buyer's credit may include credit history, current credit limit, any outstanding account issues, recouping of payment, and the like. For example, the determination regarding the buyer's credit may be made via a shipper financial institution, e.g., a bank. As such, the shipper financial institution may notify the clearinghouse that the buyer's credit is approved (step 413). For example, the various notifications could be via electronic mail, fax, telephone, other electronic methods, mail, or the like. In addition, notification may include information regarding the product sold, the amount of the product (e.g., number of pounds of seafood), price of the product, the date and time of the sale, the projected ship date, and the like. If the buyer's credit is approved, then the clearinghouse directs the shipper financial institution (e.g., bank) to place a hold on the buyer's account (e.g., funds) in accordance with the buyer's order. As such, placing a hold on the buyer's account and/or funds reduces liability and other complications for the parties awaiting payment (e.g., the seller, the shipper, and/or interactive database 213), because the funds may be guaranteed by the financial institution (e.g., an insured bank). Moreover, the shipper financial institution may be one or more national and/or international banks that may expedite transfer of funds, so that the complexities of using international currency may be addressed by using interactive database 213. On the other hand, if the buyer's credit is not approved, then the hold placed on the inventory and/or the buyer's account (e.g., funds, credit, etc.) is released so that other buyers may request the released inventory (step 415). In addition, the buyer may resume searching interactive database 213 in order to attempt another transaction.

Figure 5:
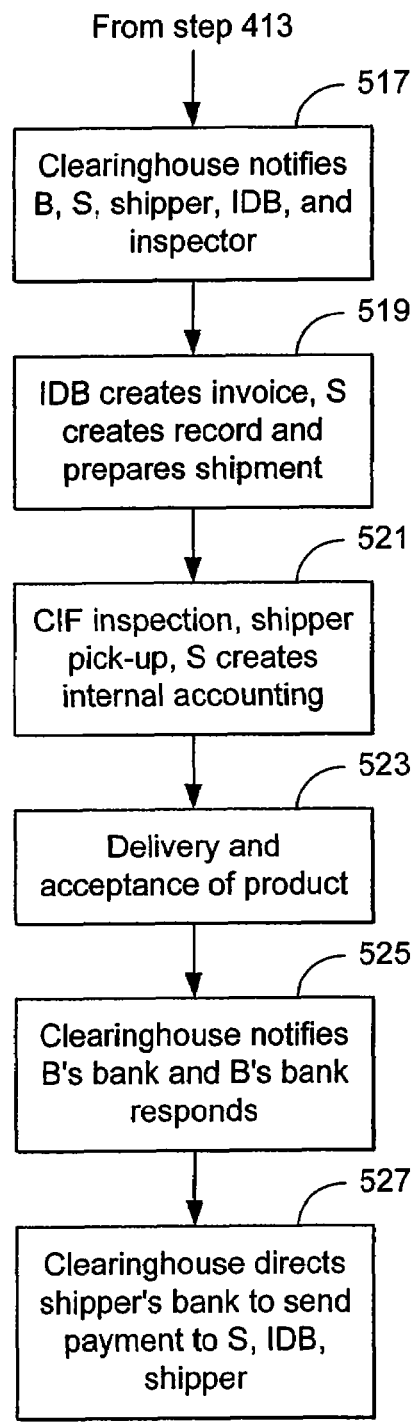
FIG. 5 illustrates the continuation of the method for transacting business between a buyer and a seller using the interactive database in FIG. 4 in accordance with an exemplary embodiment of the present invention.

The method of FIG. 4 continues in FIG. 5 further illustrating the method for transacting business between the buyer and the seller using interactive database 213 in accordance with an exemplary embodiment of the present invention. Assuming that the buyer's credit is approved, so that the clearinghouse is notified in step 413, the clearinghouse notifies at least one of the buyer, seller, shipper, interactive database 213, and the inspector for the CIF of the approved buyer's order information (step 517). Of course, notifying at least one of the buyer, the seller, or the shipper may also include specifying pickup and delivery terms for the shipper (e.g., product, seller's address, packaging, buyer's information such as address and/or drop shipment points, and the like); confirming purchase terms for the buyer and/or seller (e.g., product, cost, projected shipment date, etc.); and notifyng the inspector for CIF to inspect the product to be shipped. For example, the shipper may include a major transporter for air, sea, and/or land (e.g., Federal Express$^{SM}$ and/or United Parcel Service$^{SM}$), so that more efficient worldwide transport of the product may be available. Further, the shipper may provide CIF to help insure a quality product to the buyer. At the same time, shipping via CIF reduces liability and other complications for the other parties (e.g., the seller, interactive database host, etc.), such that most defects with respect to the shipment will be covered by insurance. Step 517 may also include interactive database 213 confirming the transaction and confirming the hold on the buyer's funds at the buyer's bank, and further notifyng the buyer, seller, and/or shipper of the projected delivery terms (e.g., product, cost, delivery date, etc.). In one embodiment of the present invention, notifying at least one of the buyer, the seller, or the shipper occurs essentially instantaneously.

Interactive database 213 creates an invoice, such as a numbered invoice for a transaction fee, and the seller creates an internal accounting of the transaction (e.g., record, bill of material, such as species, weight, and/or packaging) and prepares the product for shipment (e.g., in accordance with interactive database's 213 specifications and materials packaging) in step 519. Once the product is ready for delivery, the inspector for CIF is notified of the upcoming inspection and/or projected shipment date and inspects the shipment (step 521). In addition, the shipper creates a bill of lading, the material is picked-up for delivery to the buyer, and the seller creates an internal accounting (e.g., accounts receivable). By way of illustration, in the past, delivery of payment may have been within 30-120 days from creation of an account receivable, whereas, in accordance with an exemplary embodiment of the present invention, payment may be within about 24-48 hours from creation of the account receivable. Of course, payment may be faster or slower depending on the technology available for transfer of funds, for example. The seller may reduce inventory, begin order tracking, and the like.

The shipper delivers the product to the buyer (e.g., could be at multiple drop points) within a specified period of time (e.g., 24-48 hours) in step 523. Depending on the terms and conditions of the buyer's membership terms, the product is delivered within a specified time to the requested destination. For example, a buyer may require shipment of the product within 24 to 48 hours from the time the order was placed. Of course the specified time and the requested destination may vary for each buyer depending on the terms and conditions of the buyer's membership terms or some other specified means. In addition, one buyer may have more than one variation of time and destination terms depending on the extent of the buyer's business needs. At this point, the buyer may accept the product (e.g., sign the bill of lading). Once the transaction is complete, the shipper notifies the clearinghouse. The clearinghouse notifies the buyer's bank to indicate that the transaction is complete (step 525). As discussed above, once the buyer's bank is notified, the buyer's bank may release the buyer's funds, deposit the funds in the shipper's financial institution (e.g., in the buyer's country of residence), and restore the buyer's credit information. For example, depending on the terms and conditions of various agreements between the financial institution and the interactive database host, the payments may be made in real time or alternatively within a specified timeline. At this point, the buyer's bank notifies the clearinghouse that the funds transfer is complete.

Finally, the clearinghouse directs the shipper's financial institution to send payment to at least one of the seller, the shipper, and interactive database 213, in their respective countries of origin (step 527). Once again payment may be within about 24-48 hours from creation of the account receivable. Once interactive database 213 receives payment, interactive database processes the payment (e.g., credits the invoice/transaction fee) and the relevant inventory is deleted from the hold inventory leaving only transactions not completed. Once the transaction between the buyer and the seller is completed, the buyer may either exit access to interactive database 213 or proceed with another transaction. Of course, one or more parties may access interactive database 213 at any time having real-time access to relevant information. FIGS. 4 and 5 provide an exemplary embodiment of a method of the present invention for transacting business between a buyer and a seller. Of course, the method may involve multiple buyers, sellers, and/or various other parties. In addition, the various steps are not illustrated in order, but rather provide one exemplary embodiment of one exemplary transaction between a buyer and a seller.

Figure 11:
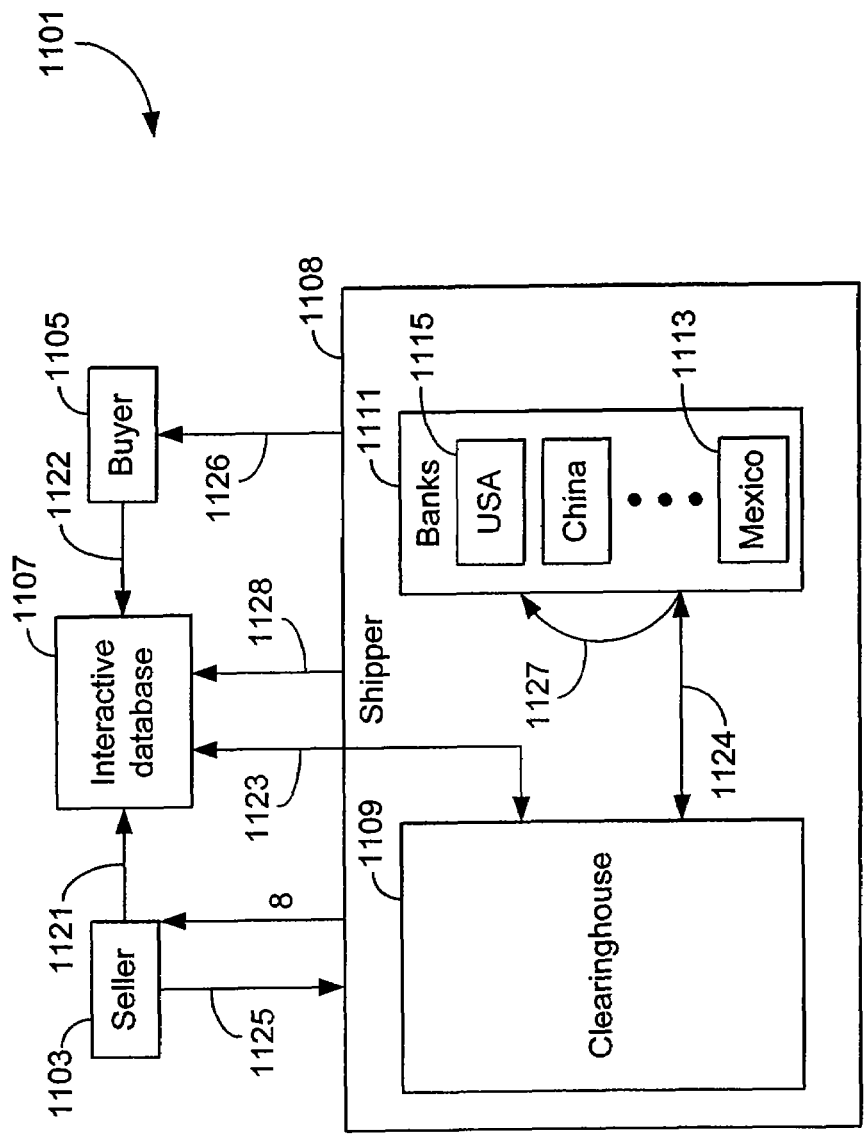
FIG. 11 illustrates a system including an exemplary transaction between a seller and a buyer using an extranet in accordance with an exemplary embodiment of the present invention.

Referring now to FIG. 11, a system 1101 illustrates an exemplary transaction between a seller 1103 and a buyer 1105 using an interactive database 1107 in accordance with an exemplary embodiment of the present invention. Of course, the buyer and/or seller may be from various countries worldwide, and additionally, there may be one or more buyers, sellers, and/or other parties/entities involved in various transactions. Different aspects of the transaction between seller 1103 and buyer 1105 are illustrated in various method steps. Seller 1103 posts inventory by inputting information into interactive database 1107, where interactive database 1107 may be part of an extranet (step 1121), as described above. Buyer 1105 selects and submits a request to purchase one or more products via interactive database 1107 (step 1122). Once buyer 1105 selects and confirms purchase of one or more products, the specified inventory is locked-out (i.e., placed on hold). A shipper 1108 system (e.g., an international shipper, such as Federal Express$^{SM}$, United Parcel Service$^{SM}$, and/or the like) may include a clearinghouse 1109 system and/or one or more bank 1111 systems that associate with shipper 1108 system.

Figure 12:
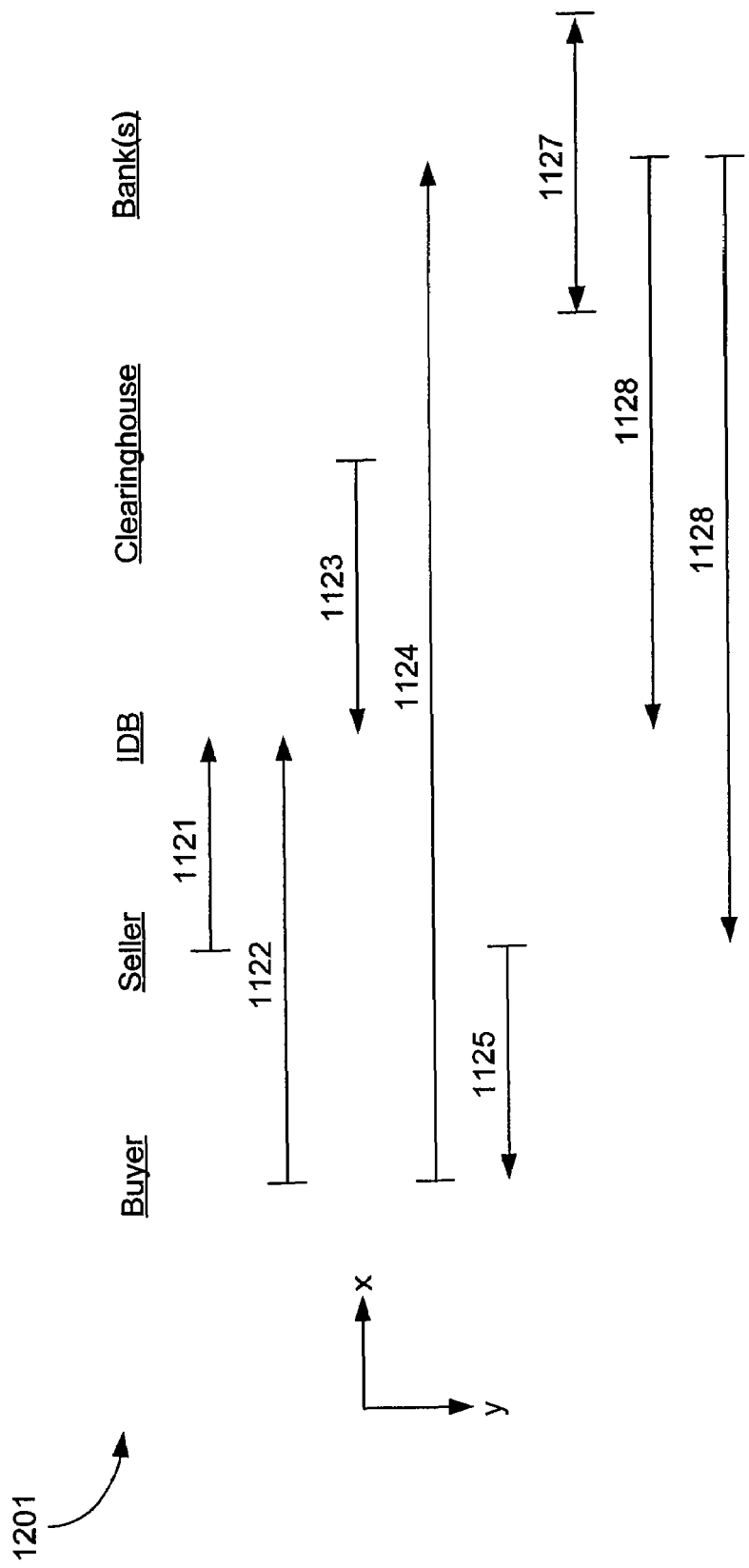
FIG. 12 illustrates a process flow diagram in accordance with an exemplary embodiment of the present invention.

The clearinghouse 1109 may either approve or reject buyer's 1105 prospective purchase (step 1123). If clearinghouse 1109 approves the prospective purchase, a hold maybe placed on buyer's 1105 funds in buyer's bank (e.g., a Mexican bank, for example) in step 1124. Alternatively, if clearinghouse 1109 rejects buyer's 1105 prospective purchase, then the locked-out inventory is released. Once the locked-out inventory is released, other buyers/parties may select and/or purchase the specified inventory. Seller i 103 ships the product(s) via shipper 1108 to buyer 1105 (step 1125). Buyer 1105 accepts the product(s) (e.g., accepts the delivery and/or signs for the delivery) in step 1126. Optionally, clearinghouse 1109 directs bank 1113 to obtain the money from buyer's bank in Mexico and directs bank 1115 to make payment to the seller 1103 in the seller's country of origin (e.g., USA). Finally, bank 1111 pays interactive database 1107 and shipper 1108 in order to complete the transaction (step 1128). System 1101 is alternatively illustrated in a process flow diagram 1201 in FIG. 12 in accordance with an exemplary embodiment of the present invention. Process flow diagram 1201 illustrates various parties on the x-axis and time/sequence on the y-axis, where the various arrows correlate to the method steps of FIG. 11.

Thus, the present invention allows for substantially real-time exchange of information between parties. Of course, the present invention may also be implemented using existing bulletin boards, auctions, known multiple buyer and/or seller procurement systems (e.g., via the Internet), and the like. Although the invention has been described herein with reference to the appended drawing figures, it will be appreciated that the scope of the invention is not so limited. Various modifications in the design and implementation of various components and method steps discussed herein may be made without departing from the spirit and scope of the invention, as set forth in the appended claims.

What is claimed is:

1. A method for facilitating a sales transaction over a computer network among a buyer, a merchant and a freight carrier, comprising the steps of:

qualifying, by said freight carrier, at least one buyer and at least one merchant to participate in said sales transaction facilitated by a freight carrier, wherein said freight carrier is distinct from said buyer and said merchant, and said freight carrier is a financial facilitator between said buyer and said merchant, and wherein said freight carrier has a pre-existing relationship with an international network of financial institutions in different countries; and wherein said freight carrier facilitates, for said buyer and said merchant, freight insurance services, custom services, tariffs services, duties services, currency services, shipping services at multiple drop points, transaction fee services, clearinghouse services, tracking of goods services, and establishing terms of sale;

and wherein qualifying includes analyzing merchant qualifying data associated with said merchant, wherein said merchant qualifying data includes credit information, system users, Hazard Analysis and Critical Control Point (HAACP) Compliance Certificate, in accordance with Food and Drug Administration regulations, site inspection information, designated bank, amount of inventory for posting, percentage of inventory for posting, Certified Insured Freight (CIF), fee structure and payment type;

contractually obligating said merchant to refrain from selling goods associated with a locked out line item, obligating said merchant to relinquish control of said goods to said freight carrier, and transferring responsibility of collection of buyer funds to said freight carrier; receiving information related to establishing a buyer account containing deposited buyer funds at a financial institution which is associated with said freight carrier;

receiving, by said freight carrier, a buyer account code from said buyer to allow said freight carrier to effect a hold on at least a portion of said deposited buyer funds to establish held buyer funds, wherein said buyer account code corresponds to an account which includes said deposited buyer funds in a buyer account;

receiving, by said freight carrier, a merchant account code from said merchant to allow said freight carrier to effect the depositing of said held buyer funds into a merchant account, wherein said merchant account code is associated with said merchant account;

providing a host database for facilitating on-line display of a plurality of descriptive line items corresponding to, respectively, one of a plurality of available goods from a plurality of merchants, wherein each of said descriptive line items comprises an identification of a unique good available from a unique one of a plurality of merchants;

receiving buyer input data, wherein said buyer input data includes at least one of price, quantity, fresh characteristics of the perishable goods, frozen characteristics of the perishable goods, packaging, type of perishable goods, species of perishable goods, identification of an existing merchant, drop shipping points, and FOB sites;

providing access of said on-line display by said buyer;

receiving selected identification, from said buyer, of a particular one of said plurality of line items for subsequent purchase by buyer;

effecting a lock-out of at least a portion of said identified line item on said on-line display such that at least one of said on-line display indicates unavailability of said line item and a portion of said line item is no longer displayed;

notifying said merchant to remove a unique one of said goods corresponding to said locked-out line item from one of said merchants available inventory;

analyzing buyer's credit;

if buyer's credit is satisfactory, directing, by said freight carrier, said financial institution to effect a hold on a portion of said deposited buyer funds equal to a cost of at least one of said goods associated with said identified line item and a transaction fee to establish held buyer funds through the use of said buyer account code and said selected identification, such that said portion of said deposited buyer funds are unavailable for use by said buyer as a result of said hold initiated by said freight carrier, notifying a CIF inspector to inspect said perishable soft goods corresponding to said locked-out line item;

receiving said buyer signature on a bill of lading;

and closing the transaction;

if buyer's credit is unsatisfactory, effecting an unlock of said identified line item on said on-line display such that said identified line item is re-displayed for viewing and un-removing said goods corresponding to said locked-out line item from available inventory;

wherein said closing the transaction comprises the steps of:

effecting the deposit, by said freight carrier, using said merchant account code and a tracking code, of a portion of said held buyer funds into said merchant account; and, shipping said goods based on said selected identification and corresponding to said locked-out line item from said merchant to said buyer, via said freight carrier without notifying any third party entity outside of said freight carrier, said merchant and said buyer, wherein said freight carrier includes trucks dedicated to said freight carrier and said freight carrier dispatches said trucks without coordinating with other entities, wherein said trucks are used for shipping said goods.

2. The method of claim 1, wherein allowing said freight carrier to effect a hold on at least a portion of said buyer funds to establish held buyer funds includes effecting a hold on said buyer funds equal to an amount of said transaction plus an amount of a transaction fee.

3. The method of claim 1, wherein providing a host database for facilitating on-line display of a plurality of line items corresponding to available goods from a plurality of merchants includes a plurality of line items corresponding to available goods from a plurality of merchants in a similar industry.

4. The method of claim 1, wherein providing a host database for facilitating on-line display of a plurality of line items further includes on-line display of industry-specific information.

5. The method of claim 1, wherein allowing said freight carrier to effect a hold on at least a portion of said buyer funds to establish held buyer funds includes said freight carrier having a pre-existing relationship with a financial institution which maintains said buyer account.

6. The method of claim 1, wherein effecting the deposit, by said freight carrier, using said merchant account code, of said held buyer funds into said merchant account includes said freight carrier having a pre-existing relationship with a financial institution which maintains said merchant account.

7. The method of claim 1, wherein a first financial institution associated with said buyer account and a second financial institution associated with said merchant account originate in different countries.

8. The method of claim 1, further comprising notifying at least one of said shipper, said buyer, and said merchant in substantially real-time of at least one of analyzing buyer's credit and closing the transaction.

9. The method of claim 1, wherein said providing a host database for facilitating on-line display of a plurality of line items corresponding to available goods from a plurality of merchants includes line items corresponding to seafood.

10. The method of claim 1, wherein the merchant may enter information into said host database at least one of product information, SKU numbers, fresh or frozen characteristics of the seafood, type of seafood, sales information, and buyer information.

11. The method of claim 1, wherein said freight carrier has a pre-existing relationship with an international network of financial institutions in different countries.

12. The method of claim 1, wherein said line items include at least one of product, size, packaging, quality, origin, quantity, SKU and price per pound.

13. The method of claim 1, further including receiving merchant sales data from said merchant, wherein said merchant sales data includes at least one of inventory information, product information, SKU numbers, fresh characteristics of said perishable goods, frozen characteristics of said perishable goods, type of said perishable goods, species name, sales information and buyer information.

14. The method of claim 1, wherein analyzing said buyer's credit includes analyzing said buyer's credit based upon at least one of said buyer's pre-existing profile and credit information within a database of said freight carrier, wherein said buyer's profile includes buyer order history information and buyer inspection information.

15. The method of claim 1, further including transmitting an email notification to said buyer and said merchant regarding said held buyer funds.

16. The method of claim 1, further including creating an invoice including at least one of a bill of material and a bill of lading.

17. The method of claim 1, further including effecting the deposit of a portion of said held buyer funds into an account related to said freight carrier representing a transaction fee.

18. The method of claim 1, wherein shipping said goods includes shipping said goods at a previously selected FOB site associated with said buyer.

19. The method of claim 1, wherein said goods include perishable soft goods having a limited shelf life.

* * * * *